United States Patent
Logvinov et al.

(10) Patent No.: US 7,369,579 B2
(45) Date of Patent: May 6, 2008

(54) METHOD AND SYSTEM FOR TIMING CONTROLLED SIGNAL TRANSMISSION IN A POINT TO MULTIPOINT POWER LINE COMMUNICATIONS SYSTEM

(76) Inventors: Oleg Logvinov, 27 Beacon Hill Rd., East Brunswick, NJ (US) 08816; Dirk Walvis, 214 Calcita Dr., Santa Cruz, CA (US) 95060; Lawrence F. Durfee, 85 Lenape Trail, Washington, NJ (US) 07882-2145

( * ) Notice: Subject to any disclaimer, the term of this patent is extended or adjusted under 35 U.S.C. 154(b) by 761 days.

(21) Appl. No.: 10/671,126

(22) Filed: Sep. 25, 2003

(65) Prior Publication Data

US 2004/0160990 A1 Aug. 19, 2004

Related U.S. Application Data (60) Provisional application No. 60/413,302, filed on Sep. 25, 2002, provisional application No. 60/415,111, filed on Sep. 30, 2002.

(51) Int. Cl.
 *H04J 3/06* (2006.01)
(52) U.S. Cl. ............ 370/509; 370/208; 370/442; 340/310.11
(58) Field of Classification Search ............ 370/293, 370/317, 318, 335, 342, 458, 463, 509, 503; 340/310.11, 310.12, 310.16
See application file for complete search history.

(56) References Cited

U.S. PATENT DOCUMENTS

| | | | |
|---|---|---|---|
| 4,429,299 A | 1/1984 | Kabat et al. ............ 340/310 A |
| 4,642,607 A | 2/1987 | Strom et al. ............ 340/310 A |
| 4,815,106 A | 3/1989 | Propp et al. ............ 375/36 |
| 5,355,114 A | 10/1994 | Sutterlin et al. ......... 340/310 A |
| 5,404,127 A | 4/1995 | Lee et al. ............. 340/310.02 |
| 5,977,650 A * | 11/1999 | Rickard et al. ............ 307/3 |
| 6,144,292 A * | 11/2000 | Brown ................. 455/402 |
| 6,246,325 B1 | 6/2001 | Chittipeddi ............ 340/540 |
| 6,275,144 B1 | 8/2001 | Rumbaugh ............ 340/310.01 |
| 6,300,881 B1 | 10/2001 | Yee et al. ............. 340/870.02 |
| 6,414,968 B1* | 7/2002 | Sutterlin et al. ............ 370/480 |
| 6,559,757 B1 | 5/2003 | Deller et al. ............ 340/310.01 |
| 6,778,550 B1* | 8/2004 | Blahut ................. 370/443 |
| 6,834,091 B2* | 12/2004 | Litwin et al. ............. 375/356 |
| 6,995,657 B2* | 2/2006 | Zalitzky et al. ............ 370/445 |
| 2004/0075535 A1* | 4/2004 | Propp et al. ............ 340/310.01 |
| 2004/0090994 A1* | 5/2004 | Lockridge et al. ............ 370/509 |

OTHER PUBLICATIONS

Schobinger, M.; Meier, S.R.; "A low-cost point-to-multi-point access system based on OFDM transmission"; IEEE International Symposium on Circuits and Systems, 2002. ISCAS 2002.;☐☐vol. 5, May 26-29, 2002 pp. V-417-V-420 vol. 5.*

* cited by examiner

*Primary Examiner*—Ricky Q. Ngo
*Assistant Examiner*—Gary Mui

(57) ABSTRACT

Power line communication ("PLC") signals are transmitted between a head-end PLC transceiver coupled to multiple remote PLC transceivers over a electric power and communications distribution network in accordance with a timing controlled PLC data frame which determines how much bandwidth is allocated to downstream transmission from the head-end to the remotes and to upstream transmissions from one or more of the remotes to the head-end. The configuration of the timing controlled data frame can be dynamically modified to achieve higher bandwidth for the downstream traffic and to satisfy changing bandwidth needs of each remote.

31 Claims, 7 Drawing Sheets

METHOD AND SYSTEM FOR TIMING CONTROLLED SIGNAL TRANSMISSION IN A POINT TO MULTIPOINT POWER LINE COMMUNICATIONS SYSTEM

CROSS REFERENCE TO RELATED APPLICATIONS

This application claims the benefit of U.S. Provisional Application No. 60/413,302 filed Sep. 25, 2002 and U.S. Provisional Application No. 60/415,111 filed Sep. 30, 2002, which are incorporated by reference herein.

FIELD OF THE INVENTION

This invention relates to the field of communications over conventional electric power conveying media, and more particularly, to allocating bandwidth for power line communications ("PLC") signal transmissions among PLC transceiver nodes and more specifically between a head-end PLC transceiver and remote PLC transceivers in a point to multipoint PLC system.

BACKGROUND OF THE INVENTION

The delivery of broadband data communications services, such as Internet traffic, telephony, broadcast TV and video-on-demand, to homes and business over existing power distribution systems is very attractive to content service providers as well as their customers. The power distribution systems can constitute, for example, a power distribution network that delivers energy to homes and businesses, a power distribution system within a multiple dwelling unit ("MDU") or a multiple tenant unit ("MTU"), such as a hotel or an apartment building, or any other power network environment where access to the transmission media for the purpose of the data or content delivery is shared in accordance with time division multiplexed access ("TDMA") techniques. A power line communications ("PLC") system, which can carry both power and communications signals, is a highly desirable communications signal distribution network because it usually already exists at locations where communications services are desired and does not require the installation of additional cables. As a result, the use of a PLC system to provide communications services can lead to a tremendous savings in installation costs, which in turn can translate into lower costs for services to the end customer.

Many prior art PLC systems operate in accordance with a point to point communications method where a plurality of PLC transceiver devices communicate with one another over the power line media in an ad hoc fashion, similarly as typically occurring in a lateral access network ("LAN"). As such, system complexity is required to support transmission detection and synchronization for each PLC device in the network. In such PLC systems, all of the PLC devices normally share the available communications bandwidth somewhat equally and symmetrically. In addition, some of these prior art point to point PLC systems need to implement data priority methods to handle cases of contention and bandwidth saturation.

Some prior art PLC systems are arranged in the form of a point to multipoint network configuration where the primary objective is distributing broadband data or content to destination PLC devices located in homes, businesses, MDUs or MTUs. In the point to multipoint network configuration, a main, or head-end, PLC transceiver typically is the source or distribution point of broadband data and communicates with a plurality of end point, or remote, PLC transceivers, which are destinations for the bulk of the broadband data transmitted from the head-end. Ordinarily, the data flow between the head-end and the remotes is asymmetric, where the bulk of the data is transmitted downstream from the head-end to the remotes.

The use of adhoc or asynchronous communications methods for transmission of PLC signals in a point to multipoint network, however, has several drawbacks. First, adhoc administration of communications involves an overhead associated with media access and node synchronization and also can result in increased latency, which can degrade the quality of communications services being provided. Furthermore, networks that operate based on adhoc types of media access typically show a considerable degradation in bandwidth utilization as the number of communication nodes increases. In addition, as each of the remotes is typically utilized by a different customer located within a same point to multipoint network, the decoding of all PLC signals present on the PLC network by each of the remotes creates difficulties in maintaining isolation and security between the remotes. Consequently, in many prior art point to multipoint PLC systems, data distributed to one customer from the head-end is not isolated and protected to prevent other customers on the same network from accessing the data.

Therefore, a need exists for a system and method for efficiently utilizing available bandwidth for PLC signal transmissions between a head-end PLC transceiver and remote PLC transceivers in a point to multipoint PLC system configuration and also for isolating remotes from one another, reducing latency and simplifying data synchronization processing in point to multipoint PLC systems.

SUMMARY OF THE INVENTION

In accordance with the present invention, a point to multipoint PLC signal transmission system provides for timing controlled transmission of PLC signals among PLC transceiver nodes based on at least one of the PLC nodes establishing a timing controlled PLC data signal communications frame. The frame includes synchronization data, has a predetermined duration and is transmitted at predetermined intervals over the power line network to which the PLC nodes are connected. The PLC nodes receive and transmit PLC signals based on the synchronization data contained in the periodically transmitted timing frame.

In accordance with one aspect of the present invention, a point to multipoint PLC signal transmission system provides for timing controlled transmission of PLC signals between a head-end PLC transceiver and a plurality of remote PLC transceivers. The timing controlled PLC signal transmission permits selected allocation and dynamic adjustment of the amount of PLC system bandwidth utilized for PLC signal transmissions from the head-end to at least one the remotes ("downstream traffic") and from at least one of the remotes to the head-end ("upstream traffic").

In a preferred embodiment, the timing controlled transmission is in accordance with a time division multiplexed ("TDM") and frequency division multiplexed ("FDM") PLC signal transmission system frame configuration in which more bandwidth is allocated to downstream traffic than to upstream traffic. The frame, which includes synchronization data, is transmitted periodically onto the power line network. Assignment of time slots of the system data frame to upstream and downstream traffic is based on specific requirements imposed by desired communications services. For broadband connection sharing, time slots are assigned asymmetrically between upstream and downstream traffic. The assignment of time slots to achieve downstream and upstream bandwidth use targets is determined in relation to PLC system requirements, such as, for example, implementation costs and complexity of PLC equipment, data transmission rates, maximum delay spread, network configuration such as expected maximum number of remotes, and transmission characteristics typically associated with desired power line network segments, such as those existing at MDUs and MTUs.

FDM further provides that an allocated time period of a timing frame can be partitioned to a greater extent, and therefore among greater numbers of remotes, such that a head-end has the ability to simultaneously transmit to multiple remotes utilizing different sets of tones for each remote. Alternatively, multiple remotes can transmit to the head-end within the same allocated time period, where each remote uses a specific set of tones.

In a preferred embodiment where the head-end is the source of distribution point for the bulk of the data communicated in the point to multipoint PLC network, the head-end controls the timing of PLC signal transmissions from itself to all of the remotes and from each of the remotes to itself.

In a preferred embodiment, the head-end in a point to multipoint PLC system generates a TDM frame configuration for controlling PLC signal transmission between itself and each of the remotes based on the selection of suitable values for each of the following parameters: sampling frequency, symbol length for downstream and upstream traffic, number of symbols for each of upstream and downstream traffic, portion of a symbol occupied by error correction data, portion of a symbol occupied by broadband or content data, system operating bandwidth, aggregate frame length for upstream and downstream symbols, PLC carriers available for each symbol and order(s) of modulation for each of the PLC carriers. The order(s) of modulation and error correction techniques preferably are selected to achieve maximum or optimized system performance, in other words maximum or optimized downstream and upstream bandwidth and quality of communications service, based on transmission characteristics typically associated with the power line network segments over which the PLC transmissions are expected to occur. In a preferred embodiment, the head-end dynamically adjusts one or more of the parameters to obtain a desired upstream and downstream bandwidth and quality of communications service performance for the point to multipoint PLC system.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF THE INVENTION

The present invention of timing controlled transmission of PLC signals in a point to multipoint PLC system is explained in connection with operations performed at a head-end PLC transceiver and remote PLC transceivers of an OFDM PLC system in which PLC data signals are conveyed over conventional utility electrical power media. It is to be understood, however, that the present invention can be implemented using other frequency division multiplexing PLC system configurations or where all of the PLC signal transmissions have frequencies within a single operating frequency bandwidth.

Figure 1:
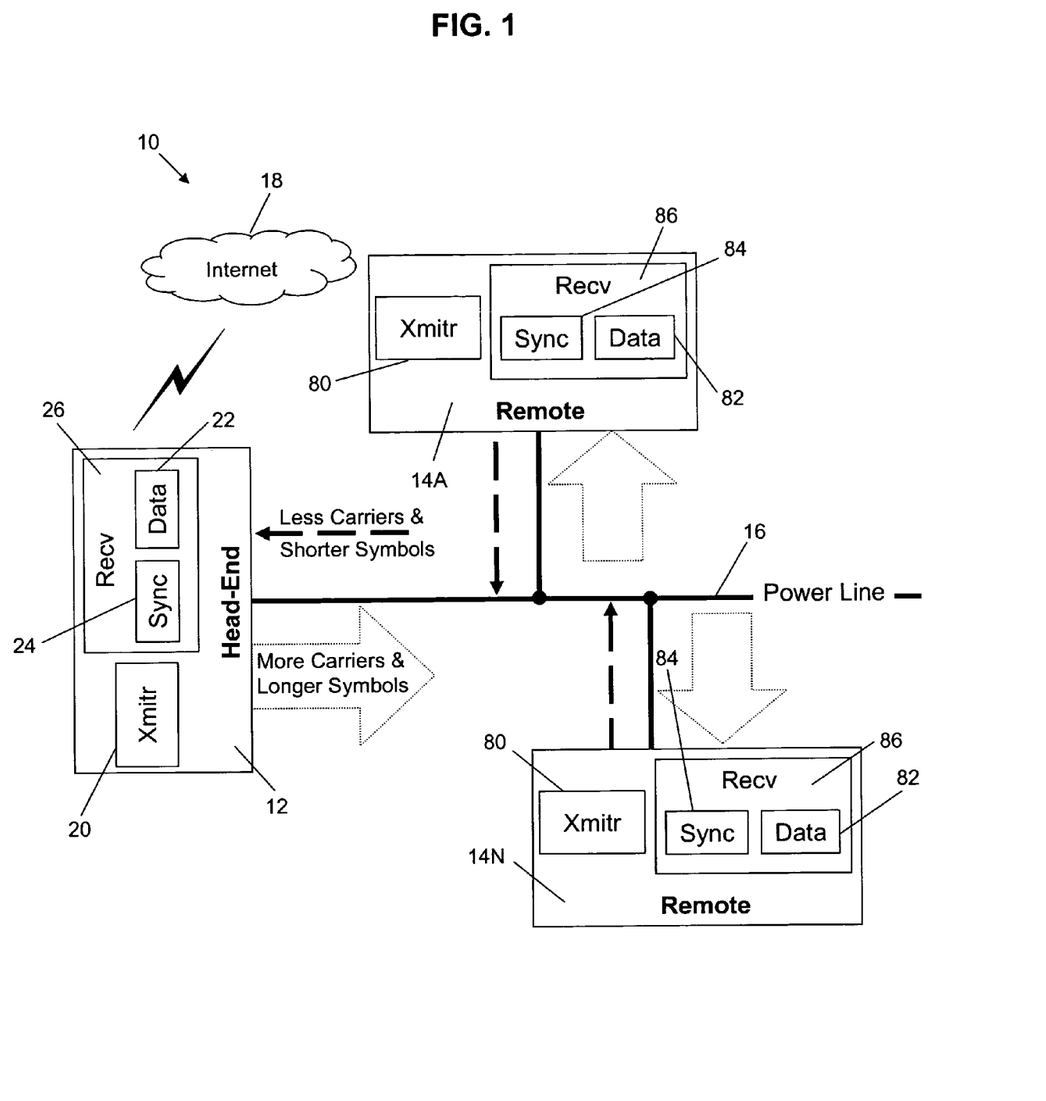
FIG. 1 is an exemplary point to multipoint PLC system which provides for timing controlled PLC signal transmissions in accordance with the present invention.

FIG. 1 illustrates an exemplary point to multipoint PLC system 10 which provides for timing controlled PLC signal transmissions in accordance with the present invention. Referring to FIG. 1, a head-end PLC transceiver 12 couples sites on the Internet 18 to a power line network 16. The system 10 further includes a plurality of remote PLC transceivers 14 (only remotes 14A and 14N are shown) which are also coupled to the power line 16. The head-end 12 and the remotes 14 include conventional PLC equipment that provides for conventional PLC signal transmission between the head-end 12 and the remotes 14 over the power line 16. See, for example, U.S. patent application Ser. Nos. 10/211,033, filed Aug. 2, 2002 and Ser. No. 10/309,567, filed Dec. 4, 2002, each of which is assigned to the assignee of this application and incorporated by reference herein, for a description of conventional PLC transceiver construction and operation.

Referring to FIG. 1, the head-end 12 includes a PLC transmitter 20 and a PLC receiver 26. The receiver 26 includes PLC receiver signal processing components which, among other modules, include a data processing module 22 and a synchronization module 24. The remote 14 includes a PLC transmitter 80 and a PLC receiver 86 The receiver 86 includes PLC transmitter signal processing components which, among other modules, also include a data processing module 82 and a synchronization module 84. As discussed in detail below, the modules 24 and 84 perform processing operations that determine what is the timing control frame of the PLC system and provide the information that is used to implement the timing controlled PLC signal transmission features of the present invention.

In accordance with the present invention, the head-end 12 provides for timing controlled transmission of PLC signals between itself and the remotes 14 in the PLC system 10. The timing controlled transmission preferably provides for delivery of broadband communications services, such as streaming video, streaming audio, web content, etc., from the head-end 12, which is broadband data service provider or distributor, to remotes 14 located in homes, businesses, MDUs or MTUs. Design trade-offs related to PLC system quality of communications service performance, upstream and downstream bandwidth, and PLC equipment and system design complexity determine how PLC system parameters, which are described in detail below, are selected and computed to obtain a desired timing controlled transmission configuration for a point to multipoint PLC system.

Referring to FIG. 1, the head-end 12 preferably provides for orthogonal frequency division multiplexed ("OFDM") PLC signal transmissions between the head-end 12 and the remotes 14. For PLC signal transmissions from the head-end to the remotes, the transmitter 20 generates downstream PLC signals and, and at a predetermined time of a timing control frame, transmits all of the downstream PLC signals to the receiver 86 of each of the remotes 14. For PLC signal transmissions from the remotes 14 to the head-end 12, the transmitter 80 of each of the remotes generates upstream PLC signals and the transmitters 80, at respective predetermined times of a timing control frame, transmit the upstream PLC signals to the head-end receiver 26.

Based on the timing frame configuration, the receiver of a remote is only active in receive mode during frame portions assigned to downstream transmission and is not active during frame portions when other remotes may be transmitting upstream. Therefore, one remote cannot correctly detect and decode a transmission from another remote. As a result, the inventive timing controlled PLC signal transmission configuration isolates the remotes from one another, such that private and secure data transmissions in the system are achieved.

In a preferred embodiment of the PLC system 10, such as illustrated in FIG. 1, a downstream OFDM signal that the head-end transmitter 20 transmits to the remote receivers 86 has more carriers and longer symbols than the number of carriers and lengths of symbols, respectively, of upstream OFDM signals that the remote transmitters 80 transmit to the head-end receiver 26. These differences in OFDM signal parameters can also provide for isolation among the remotes.

Figure 2:
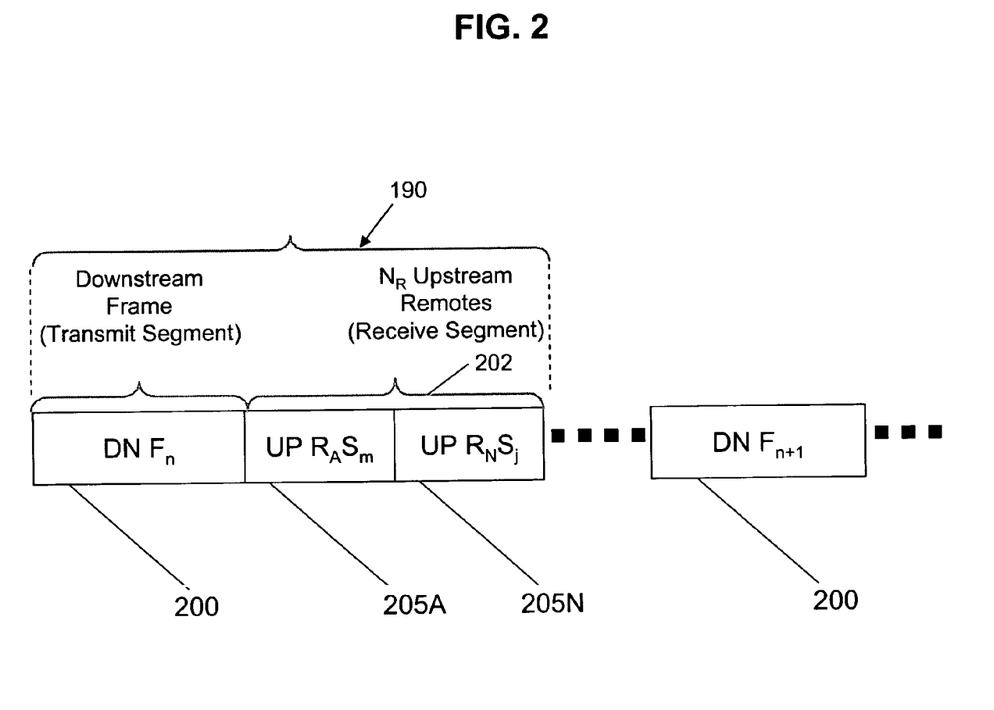
FIG. 2 is an exemplary TDM data frame structure for use in a point to multipoint PLC system operating in accordance with the present invention.

FIG. 2 illustrates a preferred, time domain multiplexed ("TDM") PLC signal frame 190 implementation of the timing controlled PLC signal transmission features of the present invention. Referring to FIG. 2, the TDM frame 190 is an aggregate frame including a transmit segment 200 having a programmed time length frame DN $F_n$, which includes a plurality of times slots and is assigned to downstream transmissions from the head-end to the remotes. The frame 190 further includes a receive segment 202 that sets forth the timing of upstream traffic transmissions from the remotes to the head-end. The receive segment 202 includes one time slot 205 assigned to each of the remotes 14 in the system 10. For example, referring to FIG. 2, the remote 14A is assigned a time slot UP $R_A S_m$, where m is the frame sequence number of the time slot S in the frame 190 assigned to the remote 14A for upstream transmission. The time slots in the frame 190 are preferably assigned to provide for asymmetrical time durations, where most preferably the number of downstream traffic time slots exceeds the number of upstream traffic slots.

In accordance with the present invention, the downstream transmit frame segment is transmitted for every aggregate frame transmission. This timing controlled repetitive transmission of a transmit frame segment with each aggregate frame transmission simplifies system-level synchronization and timing information determination at the remotes because each of the remotes receives the transmit frame and uses the structure and composition of the frame to synchronize the timing for the entire aggregate frame. Synchronization data processing at each of the remotes is only required to be performed on a periodic basis because the remotes have previously determined the network timing from timing information contained in a previously transmitted aggregate frame. Therefore, each remote only needs to perform synchronization data processing on an occasional basis to perform fine tune adjustments to each of its internal timing references. Thus, the synchronization data processing does not involve performing complex synchronization tasks related to determining the timing of a transmission on a per transmission basis.

In a further preferred embodiment, assignment of the upstream time slots in the receive segment is adjustable to permit, for example, that multiple time slots can be assigned to one remote to increase the data transfer rate for that remote. In another preferred embodiment, the slot assignments are dynamically adjustable to satisfy quality of communications service ("QOS") or other like PLC system needs.

In another preferred embodiment, the TDM frame 190 is used in conjunction with a frequency division multiplexed ("FDM") or a multiple remote OFDM PLC system. In addition, in FDM PLC systems where PLC signal transmission to a PLC remote or head-end overlaps in time with another transmission to a PLC remote or head-end, PLC signal transmissions are separated from one another in the frequency domain. This approach further improves the efficiency of bandwidth utilization.

The implementation of the inventive timing controlled PLC signal transmission method in a point to multipoint PLC systems advantageously provides that the volume of data transferred in the upstream and downstream directions does not need to be the same, in other words can be asymmetrical. The timing control of PLC signal transmissions can be configured, for example, in view of practical applications of a point to multipoint PLC system where, usually, large volumes of data flow from the head-end to the remote and very small quantities of data flow from the remote to the head-end. For example, in the application of a remote using a web browser to access the Internet via the head-end, most of the data is transmitted downstream from the head-end and in the form of web pages, documents, etc., contained at a web site. In contrast, upstream transmission usually corresponds to the few keystrokes and mouse clicks entered by a user at the remote, which results in a very small upstream data flow. In addition, the downstream data transmitted by the head-end, such as from an audio or video application that obtains streaming audio from a connection to a music web site or streaming video from a connection to a news web site, is also typically more time sensitive, in terms of packet to packet timing and latency, than upstream data flow.

The inventive timing controlled PLC signal transmission technique advantageously permits the asymmetrical assignment of time slots in the timing control frame, where more time, i.e.,many time slots, is allocated to the PLC signal transmissions from the head-end to the remotes and less time, i.e., fewer time slots, is allocated to transmissions from the remotes to the head-end. As a result, downstream traffic can access the power line network for larger portions of the aggregate frame time, as needed, whereas each of the plurality of remotes transmitting to the head-end is allocated a very small portion of the aggregate frame time. For example, in a PLC point to multipoint system having 25 remotes, and where a downstream frame time is 10 msec, an upstream symbol time is 1 msec and all 25 remote time slots follow the downstream slot as illustrated in FIG. 2, the latency (or aggregate frame period) for 25 remotes is 35 msec (10 msec+25×1 msec). In another preferred embodiment, the latency is further reduced by servicing half the remotes every other time slot or the making like adjustments. In contrast, if the same PLC system is operated in accordance with symmetrical time allocations, the latency is 260 msec (10 msec+25×10 msec). Thus, the assignment of multiple short time slots in a timing controlled frame configuration, such as a TDM frame arrangement, in accordance with present invention reduces total overall latency with respect to symmetrical PLC transmission configurations.

In a preferred embodiment, some of the upstream slots of the frame 190 are allocated to PLC system management needs and some of the data included within the upstream symbols associated with the upstream slots contain control information. For example, some slots in the receive segment 202 are not allocated to remotes to account for timing variations among all of the remotes and, in addition, certain carriers for an upstream symbol are allocated to control information. Likewise, some of the downstream bandwidth is dedicated to carrying control information to coordinate the operation of the system.

Figure 3:
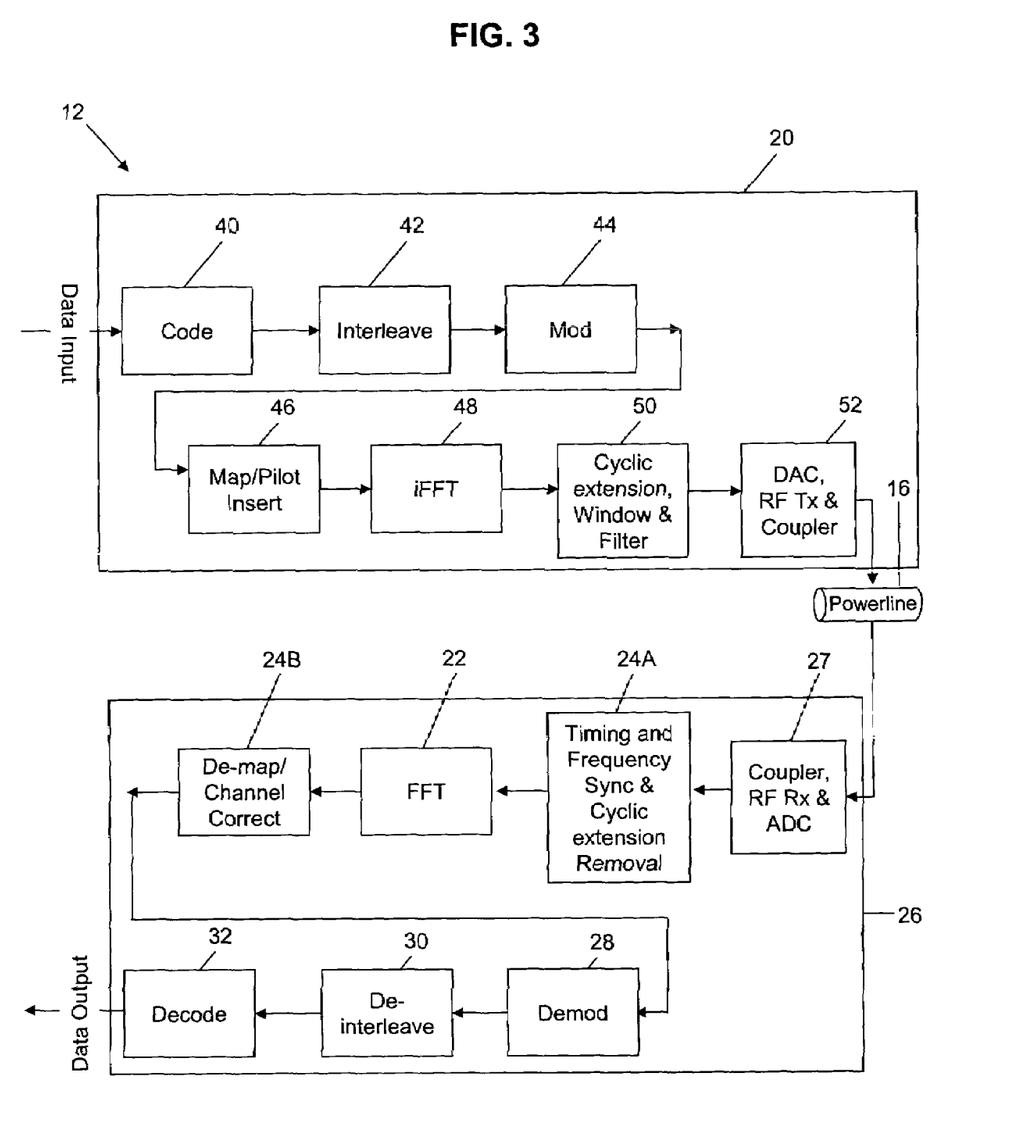
FIG. 3 is a preferred embodiment of a head-end PLC transceiver of a point to multipoint PLC system operating in accordance with the present invention.
Figure 4:
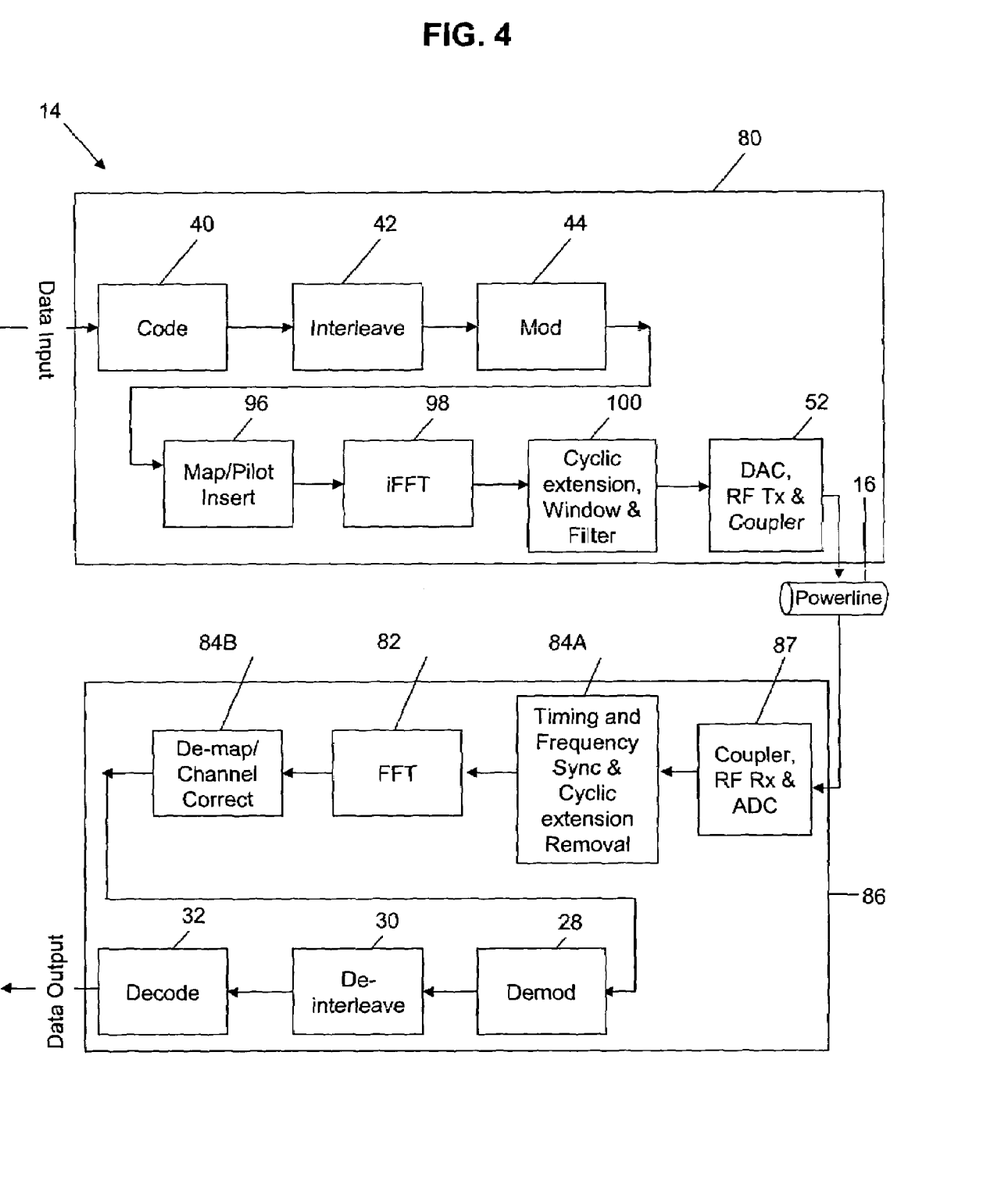
FIG. 4 is a preferred embodiment of a remote PLC transceiver of a point to multipoint PLC system operating in accordance with the present invention.

The operation of the PLC system 10 in accordance with the inventive controlled timing features is described in connection with the operations performed by PHY layer components (modules) included in a preferred OFDM head-end PLC transceiver 12, as shown in FIG. 3, and PHY layer modules included in a preferred OFDM remote PLC transceiver, as shown in FIG. 4. Referring to FIGS. 3 and 4, the head end 12 and the remote 14 include modules for performing the same types of functions, except that the modules have different configuration parameters specific to whether the module is contained in the head-end or the remote. The transmitter 20 of the head-end 12 includes an encoder 40, an interleaver 42, a modulator 44, a mapping/pilot insertion module 48, and IFFT 48, a cyclic extension window and filter 50 and a digital to analog converter ("DAC") radio frequency ("RF") transmitter and power line coupler 52 coupled in sequence to one another. The encoder 40 is for coupling to a serial data input device and the coupler 52 is for coupling to the power line 16. The receiver 26 includes a power line coupler, RF receiver and analog to digital converter ("ADC") 27, a timing and frequency synchronization and cyclic extension removal module 24A, an FFT 22, a demapper/channel correction module 24B, a demodulator 28, a de-interleaver 30 and a decoder 32 coupled in sequence to one another. The coupler 27 is for coupling to the power line 16 and the decoder 32 is for coupling to a serial data output device. The transmitter 80 of the remote 14 includes an encoder 40, an interleaver 42, a modulator 44, a mapping/pilot insertion module 96, an IFFT 98, a cyclic extension window and filter 100 and a DAC RF transmitter and power line coupler 52 coupled in sequence to one another. The receiver 86 includes a power line coupler, RF receiver and ADC 87, a timing and frequency synchronization and cyclic extension removal module 84A, an FFT 82, a demapper/channel correction module 84B, a demodulator 28, a de-interleaver 30 and a decoder 32 coupled in sequence to one another. The coupler 87 is for coupling to the power line 16. The modules 22, 27, 28, 30, 32, 40, 42, 44, 48, 52, 82, 87 and 98 are well known prior art PLC transceiver components that can perform prior art PLC signal processing operations which are well known in the art. It is noted that a remote may include fewer modules than the head-end in accordance with present invention, as more processing is performed at the head-end, to result in a more compact, lower cost remote and consequently a lower network system cost for the PLC system including multiple remotes.

In operation, the receiver 86 of a remote 14 initially performs synchronization processing on a PLC signal received from the power line 16 to extract data therefrom. The synchronization processing includes OFDM symbol boundary identification and timing and sub-carrier frequency and phase offset estimation and correction. The modules 46 and 50 in the transmitter 20 at the head-end 12 generate the synchronization data that is included in the downstream PLC signals received at the remote 14. The modules 84A and 84B in the receiver 86 at the remote 14 perform the synchronization processing. In preferred embodiments, such as an 802.11a implementation, the module 46 in the head-end transmitter 20 inserts several fixed pilots on particular sub-channels for use by the channel estimator (sub-channel time and frequency estimations) in the remote receiver 86. In another preferred embodiment of a point to multipoint PLC system operating in accordance with the Home Plug Alliance PLC system requirements, which are incorporated by reference herein, the module 46 enables and disables sub-channels in cooperation with remotes using the process known as tone mapping. In addition, the module 50 inserts preset synchronization information before the transmission of the data block that the receiver uses to estimate the timing and frequency offset of each OFDM symbol.

At the remote, the modules 84A and module 84B perform operations corresponding to those performed at the modules 50 and 46, respectively, at the head-end transmitter. The modules 84A and 84B detect and process the synchronization information to perform the synchronization tasks, in addition to their other legacy tasks. In addition, the module 82 performs fast fourier transforms on the detected PLC signals to generate an output containing amplitude and phase information at every OFDM carrier frequency.

The module 86, although not directly involved in synchronization and data recovery, contains automatic gain control ("AGC") circuits that provide for acquisition of decodable PLC signals from the power line 16.

In the preferred embodiment where the timing control frame provides that the downstream data rate exceeds the upstream data rate, OFDM PLC signal transmission uses more carriers and longer symbols for the downstream signals and fewer carriers with shorter symbols for the upstream signals. The selection of parameters to achieve this timing configuration in a TDM frame, which is preferably performed by the modules 46 and 50 in the head-end 12, is illustrated below in connection with two high-level design examples. It is to be understood that this invention similarly can be applied to generate a timing frame providing for symmetric upstream and downstream data rates or an upstream data rate that exceeds the downstream data rate.

Figure 5:
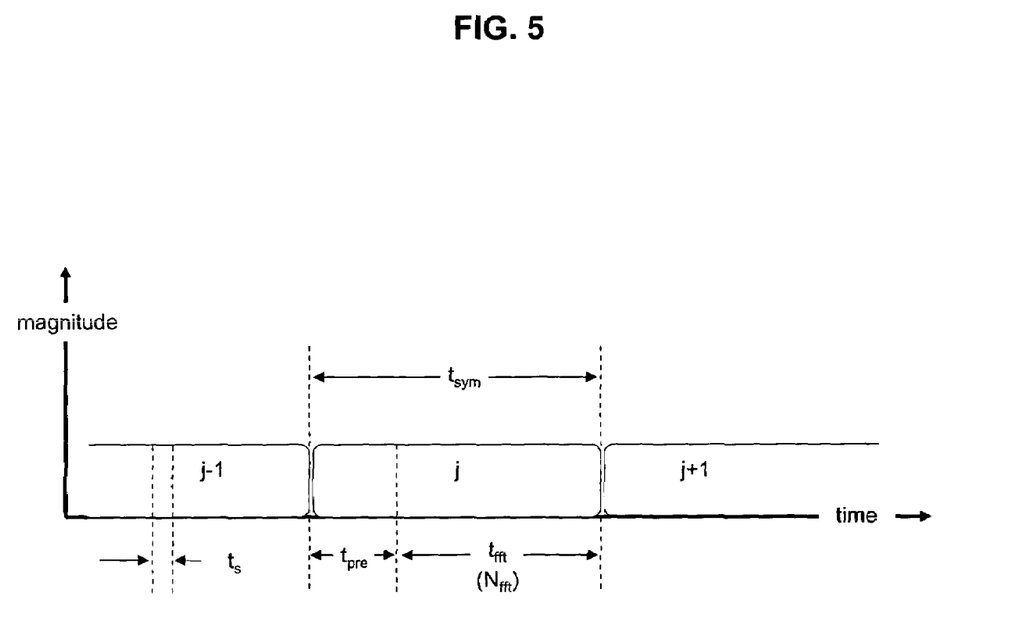
FIG. 5 is an exemplary graphical representation of timing parameters of an OFDM PLC signal.

Referring to FIG. 5, which illustrates timing characteristics of symbols included in upstream and downstream time slots, the head-end 12 computes a high-level system definition for timing controlled PLC signal transmission by selecting and/or calculating values for the following parameters:

| Parameters | Description |
| --- | --- |
| $f_s$ | Sampling frequency (e.g., 50 MHz) |
| $t_s$ | Sampling period ($1/f_s$ which is 0.02 μsec) |
| $N_{FFT}$ | Number of FFT bins (a power of 2) |
| $t_{FFT}$ | FFT Period (μsec) |
| $N_{cp}$ | Number of cyclic prefix samples |

-continued

| Parameters | Description |
|---|---|
| $t_{CP}$ | Cyclic Prefix Period (μsec) |
| Parameters | Description |
| $N_G$ | Number of guard time samples |
| $t_G$ | Guard period (μsec) |
| $t_{pre}$ | Total prefix period (μsec) |
| $N_{sym}$ | Number of symbol samples |
| $t_{sym}$ | Symbol duration (μsec) |
| $N_{SpF}$ | Number of symbols per frame (symbols/frame or remotes/R-Seg) |
| $t_F$ | Frame period (msec) |
| $f_{Min}$ | Minimum transmission frequency (MHz) |
| $f_{Max}$ | MAXimum transmission frequency (MHz) |
| $BW_{ofdm}$ | Bandwidth of the OFDM signal (MHz) |
| $N_{tones}$ | Number of carriers (tones/symbol) |
| $f_{Cdel}$ | Carrier spacing (kHz) | it is noted that, except for $f_s$ and $t_s$, each parameter has upstream and downstream components (e.g., $t_{symUP}$ and $t_{symDN}$ etc.) where the values of the upstream and downstream components may or may not be different depending on the system design. The interrelationships between the parameters are as follows:

$$t_{FFT} = N_{FFT} \times t_s;$$

$$t_{CP} = N_{cp} \times t_s;\ t_G = N_G \times t_s;\ t_{pre} = t_{cp} + t_G \quad\quad 1.$$

$$N_{sym} = N_{FFT} + N_{cp} + N_G;\ t_{sym} = N_{sym} \times t_s; \quad\quad 2.$$

$$t_F = N_{SpF} \times t_{sym}; \quad\quad 3.$$

$$BW_{ofdm} = f_{Max} - f_{Min};\ N_{tones} = BW_{ofdm}/(f_s/N_{FFT}); \quad\quad 4.$$

$$f_{Cdel} = BW_{ofdm}/N_{tones}; \quad\quad 5.$$

$$R_{raw} = (1/t_F) \times N_{SpF} \times N_{tones} \times 1\text{symbol/tone} \times 1\text{bit/symbol}; \quad\quad 6.$$

Once these parameter calculations are completed, the modulation and error correction coding factors are taken into account. These factors include the following:

| Variable | Description |
|---|---|
| $A_{mod}$ | Modulation factor (bits/symbol) |
| $A_v$ | Viterbi coding factor |
| $A_{rs}$ | Reed-Solomon coding factor |
| $R_{upRaw}$ | $R_{raw}$ for the upstream (non-aggregate) |
| $R_{dnRaw}$ | $R_{raw}$ for the downstream (non-aggregate) |
| $R_{upC1}$ to $R_{upC6}$ | Raw upstream data rate (non-aggregate) using the selected modulation/FEC combination |
| $R_{dnC1}$ to $R_{dnC6}$ | Raw downstream data rate (non-aggregate) as above |

In addition, the following are exemplary modulation and FEC combinations:

| Combo # | Modulation $A_{mod}$ | Viterbi $A_v$ | Reed Solomon $A_{rs}$ |
|---|---|---|---|
| 1 | 1 (BPSK) | ½ | 0.95 |
| 2 | 2 (QPSK) | ½ | 0.95 |
| 3 | 3 (8PSK) | ½ | 0.95 |
| 4 | 3 (8PSK) | ¾ | 0.95 |
| 5 | 4 (16QAM) | ¾ | 0.95 |
| 6 | 6 (64QAM) | ¾ | 0.95 |
| 7 | ... | ... | ... |

The interrelationships between variables are then defined as follows:

$$R_{upC1} = R_{upRaw} \times A_{mod1} \times A_{v1} \times A_{rs1};\ \text{(for combinations 1 to 6)} \quad\quad 7.$$

$$R_{dnC1} = R_{dnRaw} \times A_{mod1} \times A_{v1} \times A_{rs1};\ \text{(for combinations 1 to 6)} \quad\quad 8.$$

Figure 6:
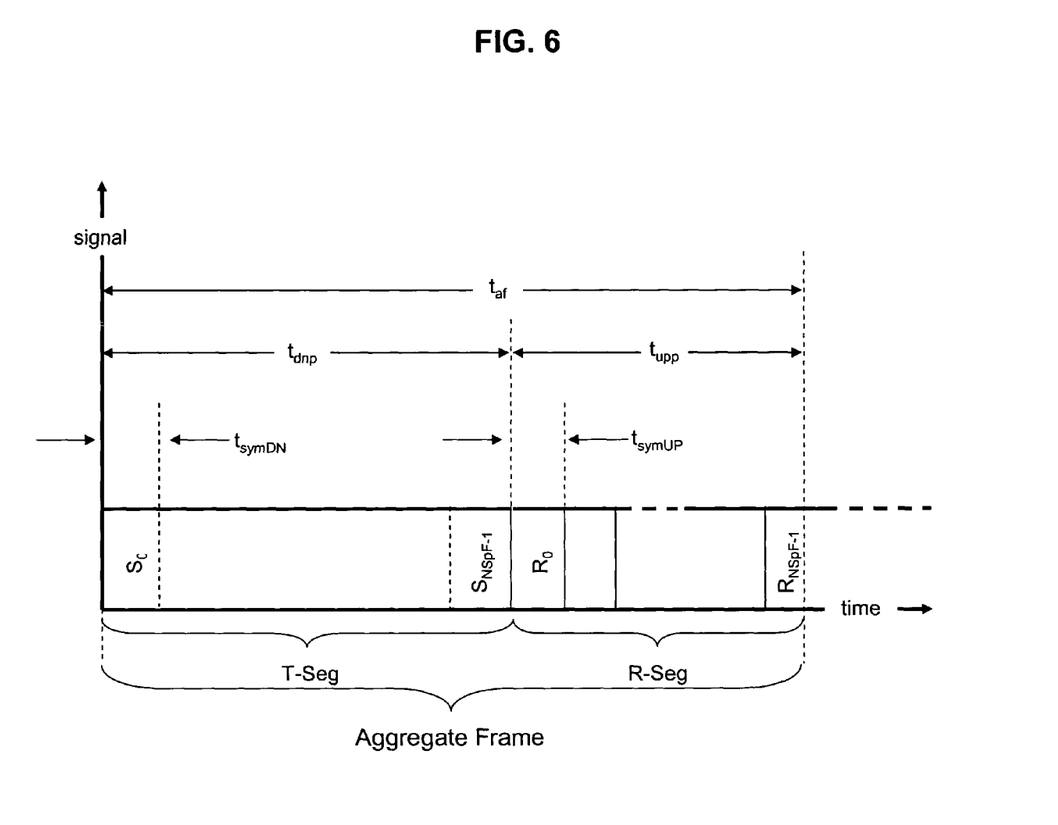
FIG. 6 is an exemplary graphical representation of timing parameters of a TDM data frame structure in accordance with the present invention.

The head-end then accounts for the following parameters of the aggregate frame, as shown in FIG. 6:

| Parameter | Description |
|---|---|
| $t_{upp}$ | Upstream transmission period (msec); |
| $t_{dnp}$ | Downstream transmission period (msec); |
| $t_{af}$ | Aggregate frame time (msec); |
| $N_{upTones}$ | Number of upstream carriers; |
| $N_{dnTones}$ | Number of downstream carriers; |
| $R_{upAg}$ | Raw aggregate rate (no modulation etc.) for the upstream data (1 symbol per remote); |
| $R_{dnAg}$ | Raw aggregate rate (no modulation etc.) for the downstream data (1 symbol per remote); |
| $R1_{upAgC1}$ to $R1_{upAgC6}$ | Aggregate rate for the upstream data using the selected modulation/FEC combination; One remote per symbol; |
| $R1_{dnAgC1}$ to $R1_{dnAgC6}$ | Aggregate rate for the downstream data using the selected modulation/FEC combination; One remote per symbol; |
| $RA_{upAgC1}$ to $R1_{upAgC6}$ | Aggregate rate for the upstream data using the selected modulation/FEC combination; All symbols to one remote; |
| $RA_{dnAgC1}$ to $R1_{dnAgC6}$ | Aggregate rate for the downstream data using the selected modulation/FEC combination; All symbols to one remote; |

The interrelationships between parameters then are defined as follows $$t_{af} = t_{upp} + t_{dnp}; \quad\quad 9.$$

$$R_{upAg} = (1/t_{af}) \times 1 \times N_{upTones} \times 1\text{symbol/tone} \times 1\text{bit/symbol}; \quad\quad 10.$$

$$R_{dnAg} = (1/t_{af}) \times 1 \times N_{dnTones} \times 1\text{symbol/tone} \times 1\text{bit/symbol}; \quad\quad 11.$$

$$R1_{upAgC1} = R_{upAg} \times A_{mod1} \times A_{v1} \times A_{rs};\ \text{(for combinations 1 to 6)} \quad\quad 12.$$

$$R1_{dnAgC1} = R_{dnAg} \times A_{mod1} \times A_{v1} \times A_{rs1};\ \text{(for combinations 1 to 6)} \quad\quad 13.$$

$$RA_{upAgC1} = R_{upC1} \times (t_{upp}/t_{af});\ \text{(for combinations 1 to 6)} \quad\quad 14.$$

$$RA_{dnAgC1} = R_{dnC1} \times (t_{dnp}/t_{af});\ \text{(for combinations 1 to 6)} \quad\quad 15.$$

It is noted that overall design targets constrain the range of values for each parameter. For example, the size of the FFT is constrained on the high end by the cost of implementation and on the low end by system performance, e.g., data rate, synchronization, etc. In addition, the minimum value for $f_{cdel}$ along with the modulation technique employed determines the transceiver sensitivity to carrier frequency offset and affects the system bit error rate ("BER"). Further, the selection of guard period ($t_G$) is based on the expected largest delay spread.

The following two examples illustrate how the head-end 12 can select and adjust system parameters to provide for timing controlled PLC signal transmission in accordance with the present invention. Initially, the head-end performs computations using non-aggregate calculations, in other words, as if the communications were continuous in one direction. These results are then modified to account for the entire aggregate frame, i.e., downstream segment and upstream segment, and FEC and modulation effects are also incorporated.

In a preferred embodiment, the parameters are selected and calculated as follows. First, the sampling frequency, $f_s$, is chosen. Then, the following parameters are selected for the upstream and the downstream path: $N_{FFT}$, $t_{CP}$, $t_G$, $t_F$ (integral number of symbols), $f_{Min}$, and $f_{Max}$. Then the remaining parameters are calculated for each case as follows:

| | | | | | |
|---|---|---|---|---|---|
| Sample Rate ($f_s$) | 50.0 | MHz | 0.02 | uS | |

| | Case 1 | | Case 2 | | |
|---|---|---|---|---|---|
| | UP | Down | UP | Down | |
| FFT ($N_{FFT}$) | 512 | 1024 | 256 | 2048 | Samples |
| | 10.24 | 20.48 | 5.12 | 40.96 | uS |
| | 55.4% | 83.1% | 30.3% | 90.8% | % of Sym Duration |
| Cyclic Prefix($N_{cp}$) | 284 | 200 | 526 | 200 | Samples |
| | 5.68 | 4.00 | 10.52 | 4.00 | uS |
| | 30.7% | 16.2% | 62.2% | 8.9% | % of Sym Duration |
| Guard Time ($N_G$) | 128 | 8 | 64 | 8 | Samples |
| | 2.56 | 0.16 | 1.28 | 0.16 | uS |
| | 13.9% | 0.6% | 7.6% | 0.4% | % of Sym Duration |
| Symbol Duration ($N_{sym}$) | 924 | 1232 | 846 | 2256 | Samples |
| | 18.48 | 24.64 | 16.92 | 45.12 | uS |
| Symbols/ Frame ($N_{SpF}$) | 105 | 630 | 146 | 365 | Symbols |
| Up/Dn Frame Ratio | 0.167 | | 0.400 | | |
| Frame Duration ($t_F$) | 1.9404 | 15.5232 | 2.47032 | 16.4688 | mS |
| UP/Dn Frame Duration Ratio | 0.125 | | 0.150 | | |
| Min Freq ($f_{Min}$) | 5.00 | 5.00 | 5.00 | 5.00 | MHz |
| Max Freq ($f_{Max}$) | 21.00 | 21.00 | 21.00 | 21.00 | MHz |
| Channel BW ($BW_{ofdm}$) | 16.00 | 16.00 | 16.00 | 16.00 | MHz |
| Overall BW | 16.00 | | 16.00 | | MHz |
| Num Carriers ($N_{tones}$) | 164 | 328 | 82 | 655 | |
| Carrier Spacing ($f_{Cdel}$) | 97.56 | 48.78 | 195.12 | 24.43 | kHz |
| Raw Data Rate ($R_{raw}$) | 8.87 | 13.31 | 4.85 | 14.52 | Mb/S |
| Mod/FEC Combo 1 | 4.22 | 6.32 | 2.30 | 6.90 | Mb/S |
| Mod/FEC Combo 2 | 8.43 | 12.65 | 4.60 | 13.79 | Mb/S |
| Mod/FEC Combo 3 | 12.65 | 18.97 | 6.91 | 20.69 | Mb/S |
| Mod/FEC Combo 4 | 18.97 | 28.45 | 10.36 | 31.03 | Mb/S |
| Mod/FEC Combo 5 | 25.29 | 37.94 | 13.81 | 41.37 | Mb/S |
| Mod/FEC Combo 6 | 37.94 | 56.91 | 20.72 | 62.06 | Mb/S |

Figure 7:
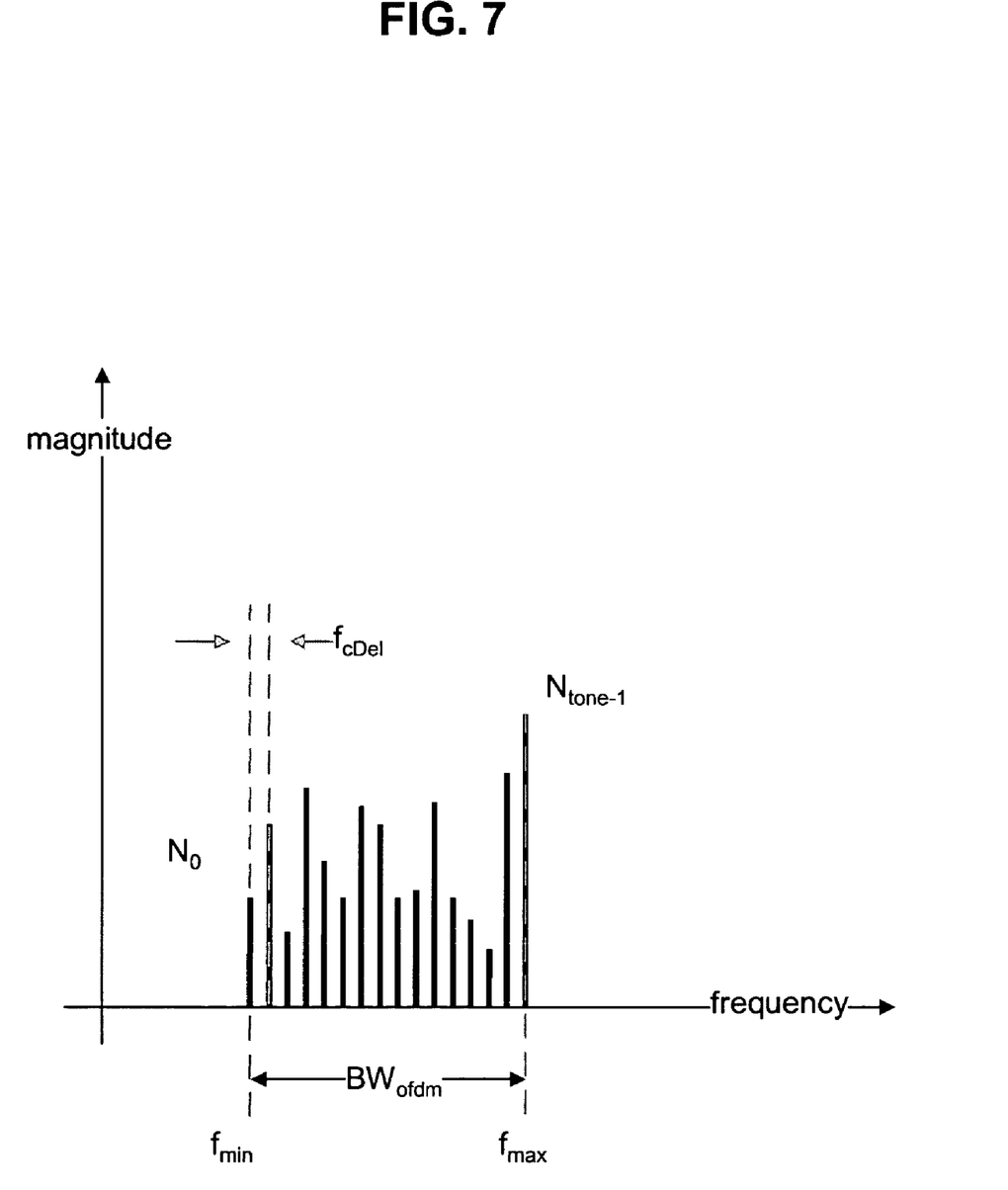
FIG. 7 is an exemplary graphical representation of an OFDM PLC system operational bandwidth.

FIG. 7 representatively illustrates the results of the above computations.

Next, the head-end performs calculations to take into account modulation, FEC and the aggregate frame structure. The results of calculations for each case with the remaining parameters are shown below.

| | Case 1 | | Case 2 | |
|---|---|---|---|---|
| Aggregate frame period | 17.46 | mS | 18.94 | mS |
| Number of remotes | 105 | | 146 | |

| | Case 1 | | Case 2 | |
|---|---|---|---|---|
| | UP kilo bits/Sec | Down Mb/S | UP kilo Bits/Sec | Down Mb/S |
| Raw Data Rate | 9.39 | 11.83 | 4.00 | 13.00 |
| | min/max | | min/max | |
| Mod/FEC Combo 1 | 4.46 | 5.62 | 1.90 | 6.18 |
| | 468.37 | | 300.26 | |
| Mod/FEC Combo 2 | 8.92 | 11.24 | 3.80 | 12.35 |
| | 936.75 | | 600.52 | |
| Mod/FEC Combo 3 | 13.38 | 16.86 | 5.70 | 18.53 |
| | 1,405.12 | | 900.79 | |
| Mod/FEC Combo 4 | 20.07 | 25.29 | 8.55 | 27.79 |
| | 2,107.68 | | 1,351.18 | |
| Mod/FEC Combo 5 | 26.76 | 33.72 | 11.40 | 37.05 |
| | 2,810.25 | | 1,801.57 | |
| Mod/FEC Combo 6 | 40.15 | 50.58 | 17.10 | 55.58 |
| | 4,215.37 | | 2,702.36 | |

In a preferred embodiment, the head-end varies the parameters until the desired system targets are reached. As shown in the above-described example calculations, there is an integral relationship between aggregate frame segment sizes, e.g., in Case I the $N_{SpF}$ values for upstream to downstream are a ratio of 1:6 and in Case II the $N_{SpF}$ values are a ratio of 2:5, which provides for obtaining an effective synchronization.

Referring to the examples, vastly different upstream and downstream data rates are obtained in each case and varying the parameters changes system performance. The parameters are selected based on the specific operational environment. For example, the MDU environment is different than an access environment, and the North American access environment is different from the European access environment, in terms of general power line network channel characteristics relating to differences in power line deployment methods, such as frequencies, lengths of network segments, etc., as is well known. In a preferred embodiment, the timing control frame configuration design and the adjustment of the frame design preferably are performed by first defining operational parameters such as maximum transmission lengths, maximum number of remotes to support, etc.

Thus, the advantages of using timing controlled PLC signal transmission in a point to multipoint PLC system include improved security because remotes are isolated from one another; better bandwidth utilization and lower system latency because PLC signal transmissions from remotes occupy the power line network for shorter time periods; and a simplified system synchronization because the controlled timing arrangement gives repetitive timing data to the remotes based on the repeated transmission of downstream transmit segment with every aggregate frame.

Although preferred embodiments of the present invention have been described and illustrated, it will be apparent to those skilled in the art that various modifications may be made without departing from the principles of the invention.

What is claimed is:

1. A method for transmitting power line communications ("PLC") signals in a PLC system including a head-end PLC transceiver coupled to a plurality of remote PLC transceivers over utility electric power conveying media, the method comprising:
   establishing a timing controlled PLC data signal communications frame having a predetermined duration, wherein the timing frame includes a downstream time slot assigned for transmission of PLC data signals from the head-end to at least of one of the remotes and at least one upstream time slot assigned for transmission of PLC data signals from at least one of the remotes to the head-end;
   selectively allocating a first portion of the duration of the timing frame to the downstream time slot and a second portion of the duration to the at least one upstream time slot;
   transmitting the frame onto the PLC system at predetermined intervals; and
   transmitting PLC signals between the head-end and at least one of the remotes in accordance with the timing frame, comprising isolating the plurality of remote PLC transceivers from each other during the at least one upstream time slot to prevent any of the plurality of remote PLC transceivers from detecting and decoding content from any other of the remote PLC transceivers, wherein isolating the plurality of remote PLC transceivers from each other during the at least one upstream time slot comprises, for each of the plurality of remote PLC transceivers, using a different combination of one or more carriers and one or more symbol lengths for transmitting PLC signals to the head-end PLC transceiver.

2. The method of claim 1, wherein the PLC system is a frequency division multiplexed system.

3. The method of claim 2, wherein the frequency division multiplexed system is an orthogonal frequency division multiplexed ("OFDM") system.

4. The method of claim 3, wherein the head-end transmits an OFDM PLC signal simultaneously to a plurality of the remotes, wherein the OFDM signal contains an OFDM symbol for each of the remotes, each of the OFDM symbols contain at least one predetermined tone and the at least one tone is different for each of the remotes.

5. The method of claim 1, wherein the first portion is not equal to the second portion.

6. The method of claim 1, wherein the selectively allocating the duration of the timing frame includes dynamically changing the size of at least one of the first and second portions.

7. The method of claim 1, wherein the selectively allocating the duration of the timing frame includes determining an optimal size for at least one of the first and second portions based on at least one of upstream and downstream bandwidth utilization data.

8. The method of claim 1, wherein the transmitting further comprises: transmitting from the head-end a downstream orthogonal frequency division multiplexed ("OFDM") data signal having a first number of carriers and a first symbol length, transmitting from at least one of the remotes an upstream OFDM data signal having a second number of carriers and a second symbol length, wherein the first number of carriers is greater than the second number of carriers and the first symbol length is longer than the second symbol length.

9. The method of claim 8, wherein a plurality of the remotes transmits OFDM data signals and wherein the first symbol length exceeds the sum of the second symbol lengths for the OFDM signals transmitted by the respective plurality of the remotes.

10. The method of claim 8, wherein the head-end can only decode an OFDM data signal having a number of carriers and a symbol length substantially different from the first number of carriers and the first symbol length, respectively, and wherein at least one of the remotes can only decode an OFDM data signal having a number of carriers and a symbol length substantially different from the second number of carriers and the second symbol length, respectively.

11. The method of claim 1, wherein the timing frame is a time division multiplexed PLC data signal communications frame.

12. The method of claim 1, wherein isolating the plurality of remote PLC transceivers from each other during the at least one upstream time slot comprises:
   when one of the plurality of remote PLC transceivers is transmitting during the at least one upstream time slot of the communications frame, de-activating the other PLC transceivers of the plurality of remote PLC transceivers to prevent the other PLC transceivers from receiving the transmission.

13. The method of claim 12, wherein isolating the plurality of remote PLC transceivers from each other during the at least one upstream time slot further comprises:
   dividing the at least one upstream time slot of the communications frame into a plurality of upstream time slots; and
   assigning at least one time slot of the plurality of upstream time slots to each of the plurality of remote PLC transceivers.

14. The method of claim 12, wherein isolating the plurality of remote PLC transceivers from each other during the at least one upstream time slot further comprises:
   dividing the at least one upstream time slot of the communications frame into a plurality of upstream time slots; and
   reducing latency by servicing only a subset of the plurality of remote PLC transceivers during the communications frame, comprising assigning time slots only to that subset of remote PLC transceivers.

15. The method of claim 1, wherein the content comprises at least one keystroke or mouse click entered by a user of one of the remote PLC transceivers.

16. The method of claim 1, wherein the downstream time slot is assigned for transmission of both content and synchronization data.

17. A system for transmitting power line communications ("PLC") signals comprising:
   a head-end PLC transceiver coupled to a plurality of remote PLC transceivers over a PLC network, wherein the head-end transmits downstream data signals for reception by at least one of the remotes and at least one of the remotes transmits upstream data signals for reception at the head-end in accordance with a timing controlled PLC data signal communications frame having a predetermined duration,
   wherein the timing frame includes a downstream time slot assigned for the downstream data signals and at least one upstream time slot assigned for the upstream data signals, wherein the downstream time slot occupies a first portion of the duration of the timing frame and the upstream time slot occupies a second portion of the duration of the timing frame and wherein the lengths of the first and second portions are selectable, wherein the head-end transmits the frame onto the PLC system at predetermined intervals, and wherein the plurality of remote PLC transceivers is isolated from each other during the at least one upstream time slot to prevent any of the plurality of remote PLC transceivers from detecting and decoding content from any other of the remote PLC transceivers, wherein each of the plurality of remote PLC transceivers is configured to use different combination of one or more carriers and one or more symbol lengths for transmitting PLC signals to the head-end PLC transceiver.

18. The system of claim 17, wherein the head-end and the remotes operate in accordance with a frequency division multiplexed PLC system configuration.

19. The system of claim 18, wherein the frequency division multiplexed system is an orthogonal frequency division multiplexed system.

20. The system of claim 19, wherein the head-end transmits an OFDM PLC signal simultaneously to a plurality of the remotes, wherein the OFDM signal contains an OFDM symbol for each of the remotes, each of the OFDM symbols contain at least one predetermined tone and the at least one tone is different for each of the remotes.

21. The system of claim 17, wherein the first portion is not equal to the second portion.

22. The system of claim 17, wherein the size of at least one of the first and second portions is dynamically adjustable.

23. The system of claim 17, wherein the size of at least one of the first and second portions is optimized based on upstream and downstream bandwidth utilization data.

24. The system of claim 17, wherein the head-end transmits a downstream orthogonal frequency division multiplexed ("OFDM") data signal having a first number of carriers and a first symbol length, and wherein at least one of the remotes transmits an upstream OFDM data signal having a second number of carriers and a second symbol length, wherein the first number of carriers is greater than the second number of carriers and the first symbol length is longer than the second symbol length.

25. The system of claim 24, wherein a plurality of the remotes transmits OFDM data signals and wherein the first symbol length exceeds the sum of the second symbol lengths for the OFDM signals transmitted by the respective plurality of the remotes.

26. The system of claim 24, wherein the head-end can only decode an OFDM data signal having a number of carriers and a symbol length substantially different from the first number of carriers and the first symbol length, respectively, and wherein at least one of the remotes can only decode an OFDM data signal having a number of carriers and a symbol length substantially different from the second number of carriers and the second symbol length, respectively.

27. The system of claim 17, wherein each of the plurality of remote PLC transceivers is configured to de-activate whenever any other one of the plurality of remote PLC transceivers is transmitting during the at least one upstream time slot of the communications frame, in order to prevent receipt of the transmission.

28. The system of claim 27, wherein:

the at least one upstream time slot of the communications frame is divided into a plurality of upstream time slots; and at least one time slot of the plurality of upstream time slots is assigned to each of the plurality of remote PLC transceivers.

29. The system of claim 27, wherein:

the at least one upstream time slot of the communications frame is divided into a plurality of upstream time slots; and the plurality of upstream time slots is assigned to a subset of the plurality of remote PLC transceivers, such only a portion of the plurality of remote PLC transceivers is serviced during the communications frame in order to reduce latency.

30. The system of claim 17, wherein the content comprises at least one keystroke or mouse click entered by a user of one of the remote PLC transceivers.

31. The system of claim 17, wherein the downstream time slot is assigned for transmission of both content and synchronization data.

* * * * *